Patented Apr. 9, 1946

UNITED STATES PATENT OFFICE 2,397,976

STABILIZATION OF FATS AND OILS

Daniel Keith O'Leary, Mendenhall, Pa., assignor to E. I. du Pont de Nemours & Company, Wilmington, Del., a corporation of Delaware No Drawing. Application July 25, 1942, Serial No. 452,359

24 Claims. (Cl. 99—163)

This invention relates to the stabilization of edible animal, vegetable, or fish oils, fats and waxes, and more particularly to the stabilization of fatty glycerides with thio-di-fatty acids.

It is well known that vegetable, animal, and fish oils, fats and waxes tend to become rancid and discolor after storage. It is not definitely known just what causes the deterioration but it has been suggested that it may be due to oxidation or to the action of micro-organisms, to hydrolytic reactions caused by enzymes, or due to minute amounts of impurities. Such deterioration is highly objectionable and renders the fats and oils unfit for many uses. Many attempts have been made to overcome this deterioration, the addition of various substances to the fats and oils having been proposed to inhibit or retard it. Among the suggested substances have been the aromatic amino compounds, halides such as zinc chloride, salts such as sodium silicate, phenylates, and sulfocarboxylates, and the like. These substances have, for various reasons, not proven to be entirely satisfactory, many of them, for example, being too expensive, too volatile, discolor the fats and oils, are toxic, or give products having an objectionable odor or taste.

An object of the present invention is to provide stabilized edible vegetable, animal, and fish oils, fats, and waxes. Another object is to provide compounds to be incorporated in fatty substances which will retard or inhibit their deterioration and which are free from the disadvantageous properties of compounds heretofore employed for this purpose. Still another object is to provide thio-di-fatty acids such as beta-beta-thio-dipropionic as rancidity inhibitors. Other objects and advantages of the invention will hereinafter appear.

These objects may be accomplished in accordance with the invention by stabilizing edible vegetable, animal, and fish oils, fats, and waxes against rancidity by the use of thio-di-fatty acids, by which I mean compounds containing one or more sulfur atoms attached to two fatty acid groups. Examples of these acids are thio-dipropionic acid, thio-dibutyric acid, thio-divaleric acid, thio-distearic acid, thio-dipalmitic acid, and the higher thio-fatty acids. The hydrogen atoms of the aliphatic chain of these acids may be substituted with hydrocarbons and particularly alkyl, alkoxy, or other groups which do not result in imparting undesirable odor or taste to the product. Still more specifically, the aforesaid objects are accomplished by the use of such compounds as:

Alpha-alpha-thiodipropionic acid $$S[CH(CH_3)COOH]_2$$

Carboxymethyl-beta-thio-propionic acid

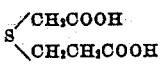

Carboxy undecyl-beta-thio-propionic acid

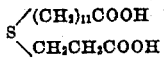

Alpha-alpha-dithiodipropionic acid $$S_2[CH(CH_3)COOH]_2$$

Beta-beta-dithiodipropionic acid $$S_2(CH_2CH_2COOH)_2$$

The preferred rancidity inhibitor of the invention is beta-beta-thio-dipropionic acid, $$S(CH_2CH_2COOH)_2$$

which is incorporated in the fat, wax, or oil in amounts ranging from 0.01 to 1.0% and generally speaking, the other compounds designated may be used on an equivalent molar weight basis.

The surprising and unexpected rancidity inhibiting effect of the thio-polycarboxylic acids is clearly demonstrated by the following tests. The tests were conducted by a method generally described as the Swift test. This method is described in "Oil and Soap," 10, 105–109 (1933), in an article by A. E. King et al., "An accelerated stability test using the peroxide value as an index." Briefly stated, this test involves placing the oil to be tested in a constant temperature bath and subsequently bubbling air through the oil. There follow results obtained on the treatment of various oils with beta-beta-thio-dipropionic acid in the Swift test. The peroxide value, as described in the above article is a measure of the degree of rancidity, each oil or fat having a fairly definite peroxide value at which it is definitely rancid.

1. Lard

| Antioxidant | Hours aeration | Peroxide value |
|---|---|---|
| None | 1½ | [1] 27 |
| Beta-beta-thio-dipropionic acid 0.025% | 11 | 12 |
| Beta-beta-thio-dipropionic acid 0.05% | 11 | 7 |
| Beta-beta-thio-dipropionic acid 0.1% | 27 | 6 |
| Beta-beta-thio-dipropionic acid 0.1% | 50 | 20 |
| Beta-beta-thio-dipropionic acid 0.25% | 51 | 3 |
| Beta-beta-thio-dipropionic acid 0.5% | 79 | 1 |

[1] Lard with peroxide value of 20 or above is rancid.

2. Soy bean oil

| Antioxidant | Hours aeration | Peroxide value |
|---|---|---|
| None | 4 | 69 |
| Do | 6 | [1] 195 |
| Beta-beta-thio-dipropionic acid 0.05% | 23 | 55 |
| Beta-beta-thio-dipropionic acid 0.1% | 43 | 6 |
| Beta-beta-thio-dipropionic acid 0.1% | 67 | 93 |

[1] This oil with a peroxide value of 195 was rancid.

3. Corn oil

| Antioxidant | Hours aeration | Peroxide value |
|---|---|---|
| None | 8 | ¹ 73 |
| Beta-beta-thio-dipropionic acid 0.05% | 60 | 22 |
| Beta-beta-thio-dipropionic acid 0.1% | 125 | 33 |

¹ This oil with a peroxide value of 73 was rancid.

4. Hydrogenated shortening

| Antioxidant | Hours aeration | Peroxide value |
|---|---|---|
| None | 43 | ¹ 120 |
| Beta-beta-thio-dipropionic acid 0.1% | 338 | 5 |

¹ This shortening with a peroxide value of 120 was rancid.

The diethyl, dioctyl and dilauryl esters of thio-dipropionic acid have also been found to be excellent antioxidants in various oils as shown by the Swift test. While they do not appear to be as effective on an equal weight basis, they are as effective on an equal sulfur content basis.

During the process of rancidification, oils and fats go through an induction period in which the peroxide value increases relatively slowly. After this induction period the peroxide value increases rapidly and the addition of antioxidants usually fails to have any effect. Thio dicarboxylic acids and especially thio dipropionic acid possesses the unusual property of reducing the peroxide value of oils if the acid is added before the end of the induction period. This property of the acid contributes to its high effectiveness as an antioxidant. The lowering of the peroxide value is accomplished by incorporating in the order of from 0.01 to 1.0% of the above rancidity inhibitors into the rancid product and then heating the resulting mixture to a temperature between 100° C. and 225° C. for from one to five hours.

The outstanding ability of thio dipropionic acid to reduce the peroxide value of oils which have started to go rancid is evident from the results of the following tests. Thus in the Swift test, cottonseed oil which had an original peroxide value of 24 was reduced to a peroxide value of 5 when heated to 99° C. for a few hours in the presence of 0.05% beta-beta-thio-dipropionic acid. Similarly soy bean oil was reduced in peroxide value from 26 to 4 with similar heating in the presence of the acid.

A further decided advantage in the use of thio dipropionic acid and its esters is that they possess excellent rancidity inhibiting properties at both high and low temperatures. Other agents of this type often lack such properties at high temperatures, which prevents their use in applications calling for the cooking of fats, such as the manufacture of potato chips, doughnuts and the like. To demonstrate this thin films of lard were exposed in glass dishes at room temperature, 50° C., 70° C., and 90° C.

| Temperature | Time to rancidity | |
|---|---|---|
| | Lard without antioxidant | Lard containing 0.1% thio dipropionic acid |
| 90° C. | 2 hours | 70 hours. |
| 70° C. | 4 hours | 186 hours. |
| 50° C. | 17 hours | 390 hours. |
| Room temperature | 5 days | 74 days. |

The acid and its esters have shown excellent rancidity inhibiting properties when used in the manufacture of potato chips. Chips made with lard and stored at 40° C. became rancid at the end of four days. If 0.1% of the acid is added to the lard for cooking, the chips will not become rancid for 10 days. Chips made with cottonseed oil became rancid after 9 days, but when 0.1% of the acid was added 37 days were required for the chips to become rancid.

These rancidity inhibitors are exceptionally useful, because of their tasteless and odorless properties at the preferred concentration, in vegetable, animal, and fish oil fat-containing foods, such, for example, as lard, lard oil, butter, oleomargarine, olive oil, cottonseed oil, corn oil, cod-liver oil, ice cream, mayonnaise, salad dressings, as well as products containing these materials such as pastry, cakes, crackers, cookies, bread, potato chips, doughnuts, popcorn, and the like.

The inhibitors may be added to the material being treated in any suitable manner. They may, for example, be mixed into the cold material; the material may be heated and the inhibitor then added (in this way beta-beta-thio-dipropionic acid can be added with facility to fats, oils, and waxes for at 135° C. the acid melts and is, therefore, easily dispersed in the molten state into the material); or any other suitable means may be employed. It is not necessary that the inhibior be miscible in the material treated for whether present, in the indicated amounts, as a solid or as a liquid it nevertheless inhibits rancidity.

While the preferred method of applying these inhibitors is by incorporating them into the fats, waxes or oil, they may be sprayed, properly diluted in water or in a solvent, or undiluted if desired on the surface of the product to be protected. This method of application is especially adapted to the protection of meats, bacon, salted nuts, shredded suet, fatty fish, etc.

The inhibitors may likewise be used in the sizing of paper, waxed paper or parchment paper to be used in the wrapping of fats, waxes, or oils, where there is direct contact between the product and the wrapper.

I claim:

1. A process which comprises protecting against rancidity a member of the group consisting of edible vegetable, animal, and fish oils, fats, and waxes, by incorporating therein a compound selected from the group consisting of thio di-fatty acids and their esters.

2. A process which comprises protecting against rancidity a member of the group consisting of edible vegetable, animal, and fish oils, fats, and waxes, by incorporating therein a thio di-fatty acid.

3. A process which comprises protecting against rancidity a member of the group consisting of edible vegetable, animal, and fish oils, fats, and waxes, by incorporating therein a thio di-fatty acid ester.

4. A process which comprises protecting against rancidity a member of the group consisting of edible vegetable, animal, and fish oils, fats, and waxes, by incorporating therein beta-beta-thio dipropionic acid.

5. A process which comprises protecting against rancidity a member of the group consisting of edible vegetable, animal, and fish oils, fats, and waxes, by incorporating therein the dilauryl ester of beta-beta-thio-dipropionic acid.

6. A process which comprises protecting against rancidity the oxygen-exposed surfaces of a member of the group consisting of edible vegetable, animal, and fish oils, fats, and waxes, by the treatment of said surfaces with thio di-fatty acids and their esters.

7. A process which comprises protecting against rancidity the oxygen-exposed surfaces of a member of the group consisting of edible vegetable, animal, and fish oils, fats, and waxes, by the treatment of said surfaces with a thio di-fatty acid.

8. A process for the retarding of the rancidity of a member of the group consisting of edible vegetable, animal, and fish oils, fats, and waxes, which comprises incorporating in the member of the group during the induction period a compound selected from the group consisting of thio di-fatty acids and their esters, and subsequently heating the resulting mixture.

9. A process for the retarding of the rancidity of a member of the group consisting of edible vegetable, animal, and fish oils, fats, and waxes, which comprises incorporating beta-beta-thio-dipropionic acid in the member of the group during the induction period and subsequently heating the resulting mixture.

10. A process for the retarding of the rancidity of a member of the group consisting of edible vegetable, animal, and fish oils, fats, and waxes, which comprises incorporating from 0.01 to 0.1% beta-beta-thio-dipropionic acid in the member of the group during the induction period and subsequently heating the resulting mixture to a temperature between 100 and 225° C.

11. A member of the group consisting of edible vegetable, animal, and fish oils, fats, and waxes, stabilized against rancidity by a compound of the group consisting of thio di-fatty acids and their esters.

12. A member of the group consisting of edible vegetable, animal, and fish oils, fats, and waxes, fortified against rancidity by a thio di-fatty acid.

13. A member of the group consisting of edible vegetable, animal, and fish oils, fats, and waxes, fortified against rancidity by an ester of a thio di-fatty acid.

14. A member of the group consisting of edible vegetable, animal, and fish oils, fats and waxes, fortified against rancidity by beta-beta-thio-dipropionic acid.

15. A member of the group consisting of edible vegetable, animal, and fish oils, fats, and waxes, fortified against rancidity by a lauryl ester of beta-beta-thio-dipropionic acid.

16. A member of the group consisting of edible vegetable, animal, and fish oils, fats, and waxes, which has been fortified against rancidity by from 0.01 to 1.0% of a member of the group consisting of thio di-fatty acids and their esters.

17. A member of the group consisting of edible vegetable, animal, and fish oils, fats, and waxes, which has been fortified against rancidity by from 0.01 to 1.0% of beta-beta-thio-dipropionic acid.

18. A fat containing food the fat content of which has been fortified against rancidity by a compound selected from the group consisting of thio di-fatty acids and their esters.

19. A fat containing food the fat content of which has been fortified against rancidity by a thio di-fatty acid.

20. A fat containing food the fat content of which has been fortified against rancidity by a beta-beta-thio-dipropionic acid.

21. A fat containing food the fat content of which has been fortified against rancidity by from 0.01 to 1.0% of a compound selected from the group consisting of thio di fatty acids and their esters.

22. Cottonseed oil fortified against rancidity by from 0.1 to 1.0% beta-beta-thio-dipropionic acid.

23. Lard oil fortified against rancidity by from 0.1 to 1.0% of the dilauryl ester of beta-beta-thio-dipropionic acid.

24. Lard fortified against rancidity by from 0.1 to 1.0% of beta-beta-thiodipropionic acid.

DANIEL KEITH O'LEARY.